I. LESTER.
FLEXIBLE TONGUE.
APPLICATION FILED SEPT. 14, 1909.
963,782.
Patented July 12, 1910.
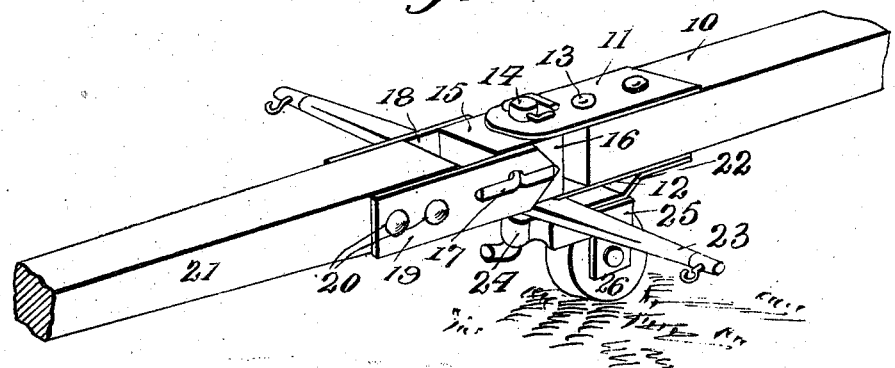
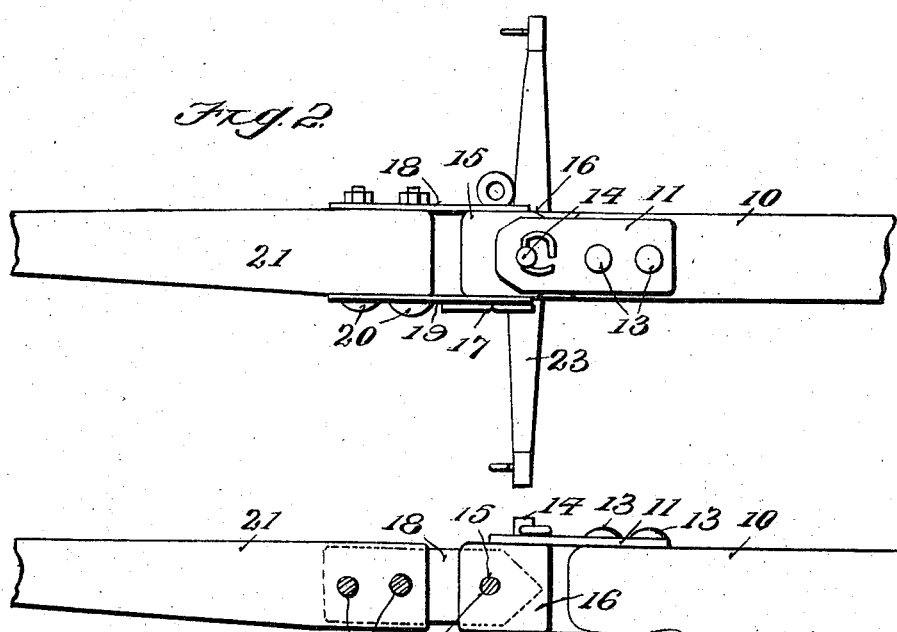
Witnesses
Inventor
I. Lester.
By
Attorneys.

UNITED STATES PATENT OFFICE.

IRWIN LESTER, OF TUSCOLA, ILLINOIS.

FLEXIBLE TONGUE.

963,782.  Specification of Letters Patent.  Patented July 12, 1910.

Application filed September 14, 1909. Serial No. 517,686.

*To all whom it may concern:*

Be it known that I, IRWIN LESTER, a citizen of the United States, residing at Tuscola, in the county of Douglas and State of Illinois, have invented certain new and useful Improvements in Flexible Tongues, of which the following is a specification.

This invention relates to poles or tongues, and refers particularly to a device of this character which is applicable to agricultural implements which are mounted upon two wheels and depend upon the tongue or pole for their balancing.

The invention has for an object the provision of a pole of this character which is yieldable both laterally and forwardly so as to remove the weight of the implement from the collars or necks of the draft animals, and also to prevent the side thrust of the pole upon the draft animals.

The invention further contemplates the provision of a combined draft and universal joint for a tongue, which combined features produce a tongue which is adapted to lessen the strain upon the draft animals and enable them to direct their strength to the draft of the implement.

The invention has for a still further object a device of this nature which is provided with means for retaining the double tree from contact with the ground to prevent the draft animals from stepping over the traces or the like and at the same time to support the disks, shovels or other devices from contact with the ground, boring holes in the ground beneath the same where such holes are not desired.

For a full understanding of the invention and the merits thereof, reference is to be had to the following description and accompanying drawings, in which:

Figure 1 is a perspective view of the improved pole or tongue; Fig. 2 is a top plan view of the same; and Fig. 3 is a side elevation thereof.

Corresponding and like parts are referred to in the following description and indicated in all the views of the accompanying drawings by the same reference characters.

Referring more particularly to the drawings the numeral 10 designates a stub tongue which is supported in any desired manner upon the implement which is to be drawn and which is provided with a pair of straps 11 and 12 secured respectively to the upper and lower faces of the stub tongue 10 and retained in such position by the provision of clamping bolts 13. The straps 11 and 12 are extended forwardly of the stub tongue 10 in parallel and are suitably apertured for the reception of a pivot pin 14 which as vertically disposed therethrough and which pivotally supports a knuckle 15. The knuckle 15 is formed of a metallic block, wood or other material being used if preferred, which is of substantially rectangular formation and having rounded corners 16 at its rear edges between the straps 11 and 12 in order to permit of the lateral swinging of the knuckle 15 about the pivot pin 14. The knuckle 15 is suitably apertured for the reception of the intermediate portion of the pivot pin 14 which is loosely disposed therethrough. The knuckle 15 is also provided with a transverse aperture through which a horizontal pivot pin 17 is disposed and which terminates at its opposite extremities through a second pair of metallic straps 18 and 19 which are clamped through the medium of bolts 20 to a pole 21 which is forwardly extended from the knuckle 15.

The pivot pin 17 is disclosed as being in the formation of a cotter pin although any form adaptable and desired may be employed which is capable of withstanding the strain which is placed upon it by reason of the draft. The stub tongue 10 carries a brace 22 which is secured against the under face of the stub tongue 10 against the lower strap 12 and is off-set downwardly to permit of the disposition of a double tree 23 between the brace 22 and the strap 12, the double tree being pivotally supported at its intermediate portion upon the lower end of the pivot pin 14. The pivot pin 14 is extended downwardly through the brace 22 and pivotally supports a head 24 from which is rearwardly extended a pair of fork arms 25. The fork arms 25 are extended rearwardly and downwardly from the head 24 and rotatably support a suitable caster wheel 26 for supporting the stub tongue 10.

In the operation of the improved pole or tongue when a force is exerted upon the pole 21 the straps 18 and 19 draw upon the horizontal pivot pin 17 and raise the knuckle 15. This action raises the forward end of the stub tongue 10 and lifts the caster wheel 26 from the ground thereby admitting of the free movement of the improved tongue with respect to the implement which is supported upon the same. When the implement to which the tongue 10 is attached is drawn over uneven ground the same will be given irregular movement which will tend to throw the pole 21 from side to side against the draft animals. This is overcome through the employment of the knuckle 15 which revolves about the pivot pin 14 and permits of the independent vibration of the stub tongue 10 with respect to the pole 21, the rear end of the pole 21 being slightly vibrated during the movement of the forward end of the stub tongue 10. The line of draft is disposed directly through the pivot pin 14 as the double tree 23 is pivotally mounted thereon and this feature thus decreases the tension upon the pole 21 and further provides a means whereby the same can be held in line with the draft upon the vibration of the stub tongue 10. The pivot pin 14 also serves the function of supporting the caster wheel 36 through the medium of the fork arms 25 and the head 24. This serves as a means for supporting the double tree 33 and the devices connected therewith when the pole 21 is released by the slackening of the traces and the double tree 23.

Having thus described the invention, what is claimed as new is:

1. In a tongue the combination of a stub tongue, a pole carried by said stub tongue, a pair of straps inwardly extended from the opposite edges of said pole, a knuckle pivotally mounted between the rear end of said straps, a second pair of straps disposed upon the upper and lower faces of said tongue and extended forwardly therefrom against the upper and lower faces of said knuckle, a pivot pin forwardly disposed through said second pair of straps and said knuckle, a double tree mounted upon the lower end of said pivot pin and a caster wheel carried upon the lower end of said pivot pin.

2. A tongue including a stub tongue, a pole, a knuckle pivotally engaged between said stub tongue and said pole, a brace carried by said stub tongue and extended in offset relation beneath said knuckle, a pin extended through said knuckle and through said brace, a double tree carried by said pin between said knuckle and said brace and a caster wheel disposed upon the lower extremity of said tongue against the under face of said brace.

3. In a tongue the combination of a stub tongue, a pole connected to said stub tongue, a knuckle disposed between said stub tongue and said pole, a pivot pin engaged through said knuckle and said tongue to connect the same, a doubletree carried by said pin, and a support mounted upon said pin for supporting said knuckle.

4. In a tongue the combination of a stub tongue, a pole connected to said stub tongue, straps outwardly extended from the inner adjacent ends of said tongue and said pole in planes at right angles to each other, a knuckle pivotally engaged between said straps, pins secured through said straps and said knuckle, a doubletree carried upon the vertical of said pins and a caster wheel mounted upon said vertical pin.

In testimony whereof I affix my signature in presence of two witnesses.

IRWIN LESTER. [L. S.]

Witnesses:
CHAS. T. ECKHART,
WILDA SMITH.